Feb. 26, 1935.　　　　A. KOLKIEWICZ ET AL　　　1,992,375
BRAKE
Filed March 2, 1934　　　2 Sheets-Sheet 1
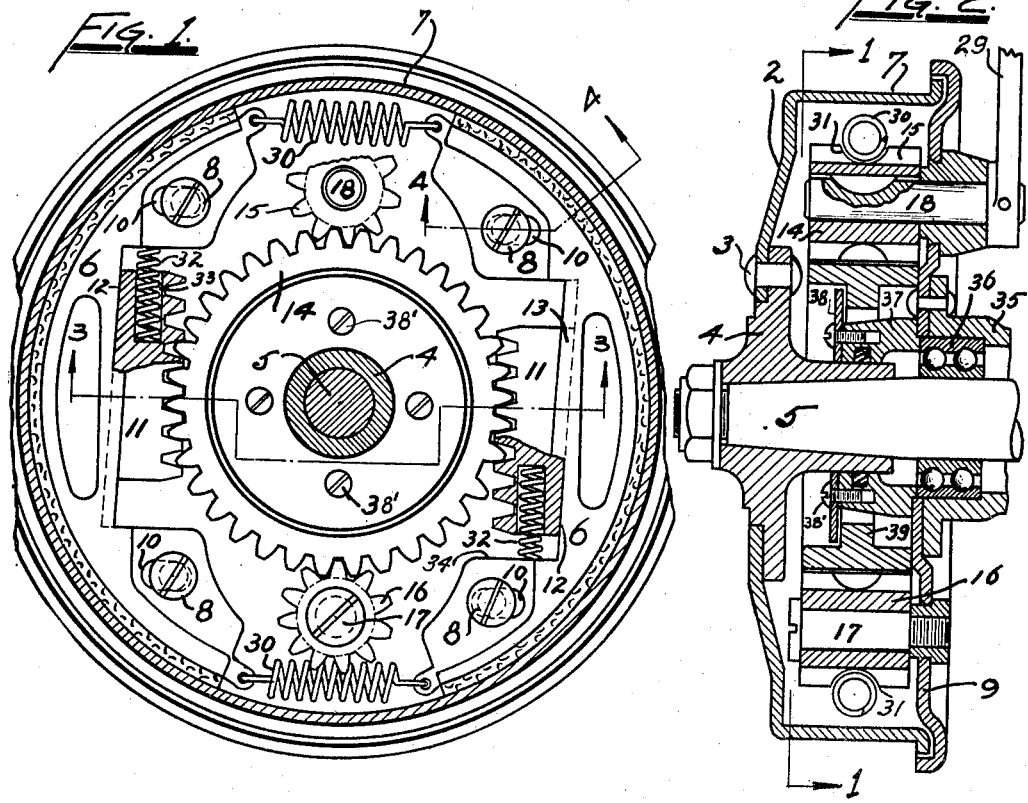

Feb. 26, 1935.  A. KOLKIEWICZ ET AL  1,992,375
BRAKE
Filed March 2, 1934  2 Sheets-Sheet 2
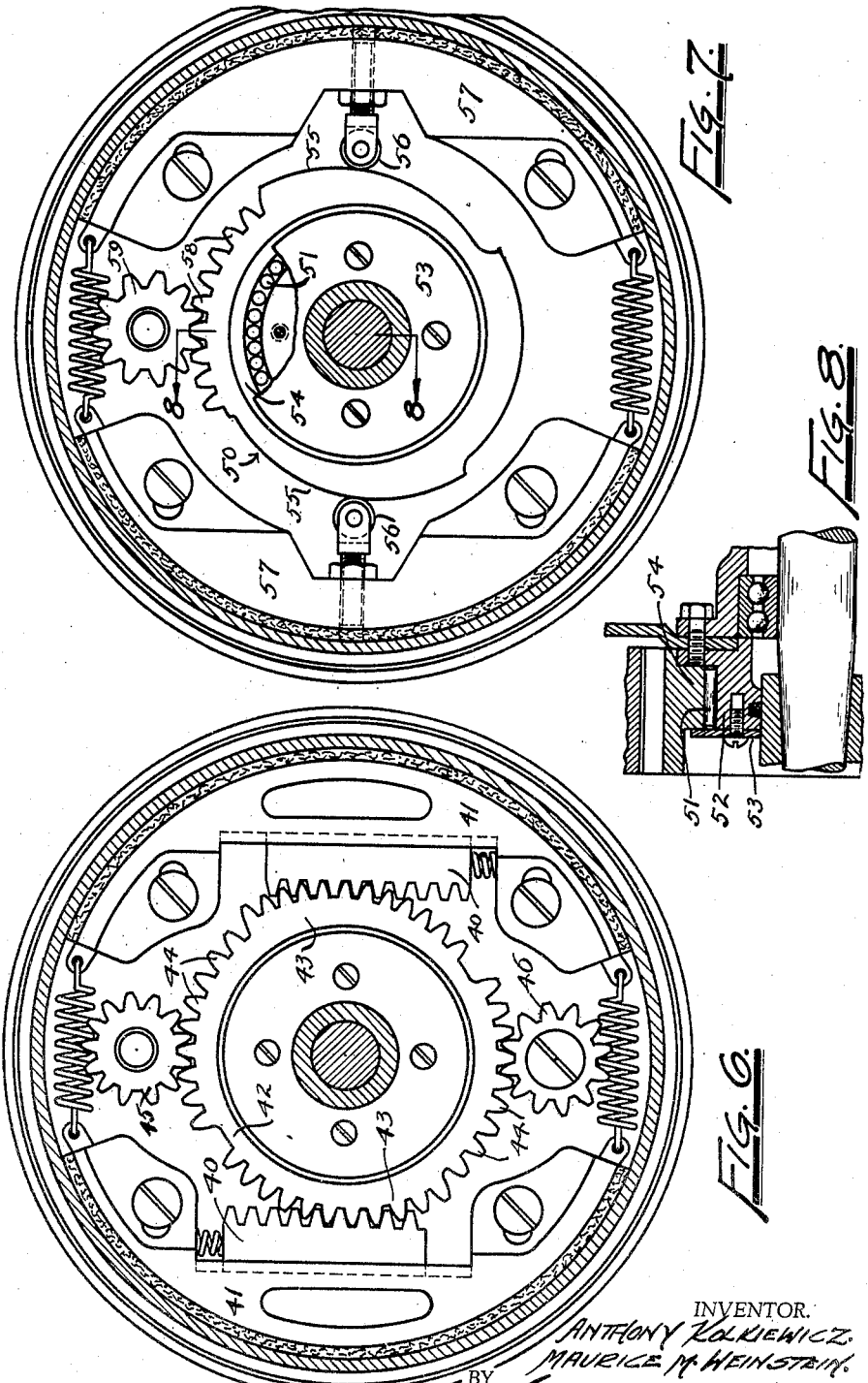

Patented Feb. 26, 1935

1,992,375

UNITED STATES PATENT OFFICE 1,992,375

BRAKE

Anthony Kolkiewicz and Maurice M. Weinstein, Detroit, Mich.

Application March 2, 1934, Serial No. 713,658

10 Claims. (Cl. 188—78)

The present invention pertains to a novel brake for motor vehicles, although it is also adapted for other braking purposes.

The principal object of the invention is to provide a brake which satisfactorily stops a motor vehicle travelling fairly rapidly. Further, an object is to provide a simple brake which is effective for all braking purposes and which is of simple and rigid construction.

These objects are attained by means of brake shoes which are mounted for a straight-line or parallel movement within the drum as distinguished from the usual pivotal movement. In this connection it is to be noted, as another important feature of this invention, that a pivoted brake shoe grips the drum with diminishing effectiveness from the pivot point outward. On the other hand, the slidable shoes in this invention have a uniform braking action throughout the length of the entire braking surface thereof.

The spreading of the brake shoes is accomplished by any suitable means, such as an involute or special cam or gear, or by a regular gear meshing with wedge shaped racks slidable in the shoes. In the latter case, the racks are actuated at will by means of an intermediate gear meshing therewith, and as this gear is turned through suitable mechanism connected to the brake pedal, the wedge shaped racks which are set in opposite directions are shifted and thereby exert a wedging action on the brake shoes whereby the latter are forced into engagement with the drum. Suitable springs are provided for retracting the parts when the pressure on the pedal is relieved.

In the preferred embodiment of the invention, the spreading cam or gear is a floating member with no fixed axis of rotation and is therefore self-centering so that it is automatically located with regard to inequalities or irregularities in the finishing of the complementary parts. Thus, equal wear on both shoes occurs without the necessity of accurate machining. The limits of the position of the floating gear are determined by the racks and by a pair of pinions between the racks.

The invention is fully disclosed by means of an example in the following description and in the accompanying drawings in which:

Figure 1 is a vertical section of the brake on the line 1—1 of Figure 2;

Figure 2 is a diametrical section of the brake in a plane passing through the rotary axis thereof;

Figure 3 is a section of the line 3—3 of Figure 1;

Figure 4 is a detail section of the line 4—4 of Figure 1;

Figure 5 is a diagrammatic view of the brake pedal assembly;

Figure 6 is a section similar to Figure 1 of a modification;

Figure 7 is a similar section of another modification, and

Figure 8 is a section on the line 8—8 of Figure 7.

Reference to these views will now be made by use of like characters which are employed to designate corresponding parts throughout.

In Figures 2 and 3 is shown a brake drum 2 attached by rivets 3 to a hub 4. The drum may be attached to any type of wheel in the usual manner as by means of bolts (not shown). The drum, in turn, is fixed to the axle end 5, also in the usual manner.

The brake drum contains a pair of brake shoes 6 each adapted to engage slightly less than half of the annular wall 7 of the drum 2. The shoes are mounted for a straight-line or parallel movement relatively to the drums as distinguished from the usual pivotal movement. This mounting consists preferably of a pair of bolts 8 for each shoe, carried by the cover plate 9, and received in slots 10 in the shoes. The two slots in each shoe are preferably spaced as far apart as possible in order to overcome the tendency toward a tilting movement.

Along the inner edge of each shoe, preferably perpendicular to the axes of the slots 10, is slidably mounted a rack adapted to have a wedge action against the shoe, such as a wedge shaped rack 11. Any suitable sliding connection may be provided such as, for example, a slot 12 in the shoe receiving a rib 13 on the back of the rack. Meshing with both racks is an intermediate operating gear 14 which in this case is a floating ring gear which finds its own center as determined by the dimensions of the complementary parts. Pinions 15 and 16 are carried by the cover 9 and meshed with the gear 14 at opposite points and between the racks 11. These four points determine the limits of the various positions that the floating gear may take, and it will be recognized in this connection that the variations in the positions of the ring gear need only be sufficient to compensate for manufacturing tolerances. The pinion 16 is an idler turning on a stud 17, and is provided merely as a locating point opposite the pinion 15. The latter is keyed to a shaft journaled in the cover plate 9 and serves to turn the ring gear 14 when actuated through mechanism connected to the usual foot pedal as will now be described.

In Figure 5 is shown the usual dash board 20 of a motor vehicle through which passes the brake pedal 21, the latter being suitably pivoted at 22 to the chassis 23 or other fixed member. A link 24 extends from the pedal to the lever 29 on shaft 18 of the rear brakes and is normally retracted by a spring 25 which must be overcome in depressing the pedal. Connected to the lower end of the pedal is a suitable set of linkage 26 including a rod 27 extending to the forward brakes. This linkage also is attached to a spring 28 which tends to return the brake pedal and other brake parts to normal position when pressure on the pedal is relieved.

It may now be seen that pressure on the brake pedal 21 causes rotation of pinion 15 and operating gear 14 in the direction that brings the gear teeth into engagement with the wider parts of the oppositely set racks 11. The sliding movement of the racks into such engagement with the ring gear causes a wedge action or outward pressure on the brake shoes. Further, the movement of the shoes is rectilinear rather than pivotal, whereby full and equal braking action is realized along the whole extent of the braking surface of the shoes. Thus, the braking effect is greater for a given size of brake than in the conventional brake of the pivotal shoe type. Further, this movement results in equal wear on the shoes and the brake lining. It will also be seen that the brake consists of a comparatively small number of simple and easily made parts, and that the brake, as a whole, is of rugged and durable construction.

The brake shoes 6 are normally drawn together by means of coil springs 30 extending from shoe to shoe at their ends, as clearly shown in Figures 1 and 2. If necessary, the pinions 15 and 16 may be grooved through the teeth to accommodate these springs as indicated by the numeral 31 in Figure 2. Although the springs 25 and 28 tend to turn the ring gear 14 and thereby shift the racks 11 to release position, this action is supplemented by coil springs 32 bearing against the smaller end of each rack. These springs are preferably seated in pockets 33 formed in the racks and positioned to bear against suitable shoulders 34 formed on the brake shoes 6. The brake may conveniently be adjusted by shortening the linkage extending from the brake pedal thereto. For example, a turnbuckle may be inserted in the linkage for this purpose.

A housing 35 for the rear axle 5 is attached to the plate 9 in the usual manner. Within the housing is contained a ballbearing 36 encircling the axle 5. An inner bearing 37 within the drum has a press fit on the hub 4 and carries a plate 38 held by screws 38'. This plate lies adjacent to a rib 39 on the ring gear 14 so that axial shifting of this gear is prevented by the plate 38 in one direction and by the plate 9 in the other direction.

In the modification shown in Figure 6, the wedge shaped racks are replaced by plain racks 40 sliding in the brake shoes 41. The operating gear 42 is formed with a substantially spiral or involute line of teeth 43 meshing with each of the racks. Between these lines of teeth are formed two series of teeth 44 at a constant distance from the center of the gear. One of these series is engaged by the actuating pinion 45 which is operated in the manner shown in Figures 1 and 2. It will be evident that the mounting of the brake shoes and the straight-line or parallel movement thereof is exactly as shown in Figure 1. On rotation of the gear 42, the racks are slid in the shoes and at the same time engaged by gear teeth at increasing distances from the center of the gear whereby the shoes are spread against the drum. The retracting action by means of the springs is similar to that already described.

In the embodiment shown in Figures 7 and 8, the shoes are spread by cams instead of the operating gear. The latter is replaced by a double cam 50 having a roller bearing mounting 51 on the inner bearing 52. The latter carries the retaining plate 53 which engages an inner rib 54 formed on the cam.

The cam has two opposed spiral or involute surfaces 55 engaging rollers 56 carried respectively by the brake shoes 57. Between the cam surfaces, the cam member is formed with an arcuate series of gear teeth 58 meshing with the actuating pinion 59. The brake shoes have a straight-line mounting such as that previously described. It will be evident that the rotation of the member 50 in clockwise direction as viewed in Figure 7 will spread the shoes in a straight-line or parallel movement into engagement with the drum.

Although specific embodiments of the invention have been illustrated and described, it will be understood that various alterations in the details of construction may be made without departing from the scope of the invention, as indicated by the appended claims.

What we claim is:
1. In a brake, a drum, a pair of brake shoes mounted in said drum and adapted for a parallel movement into engagement with the annular wall of the drum, wedge shaped racks slidably engaging said shoes, a gear rotatably mounted between and meshing with said racks, and means for turning said gear.

2. In a brake, a drum, a pair of brake shoes mounted in said drum and adapted for a parallel movement into engagement with the annular wall of the drum, wedge shaped racks slidably engaging said shoes, a floating gear mounted between and meshing with said racks, rotatable pinions engaging said gear at opposed points and between said racks, and means for turning one of said pinions for actuating said gear and racks.

3. In a brake, a drum, a pair of brake shoes mounted in said drum and adapted to engage the annular wall thereof, each shoe having straight-line sliding connection with said drum whereby it is adapted to assume a parallel movement, wedge shaped racks slidably engaging said shoes, a gear rotatably mounted between and meshing with said racks, and means for turning said gear.

4. In a brake, a drum, a pair of brake shoes mounted in said drum and adapted to engage the annular wall thereof, each shoe having a straight-line sliding connection with said drum whereby it is adapted to assume a parallel movement, wedge shaped racks slidably engaging said shoes, a floating gear mounted between and meshing with said racks, rotatable pinions engaging said gear at opposed points and between said racks, and means for turning one of said pinions for actuating said gear and racks.

5. In a brake, a drum, a pair of brake shoes mounted in said drum and adapted for a parallel movement into engagement with the annular wall of the drum, wedge shaped racks slidably engaging said shoes, a gear rotatably mounted between and meshing with said racks, means for urning said gear, and spring means normally tending to draw said racks toward the center of said drum.

6. In a brake, a drum, a pair of brake shoes mounted in said drum and adapted for a parallel movement into engagement with the annular wall of the drum, wedge shaped racks slidably engaging said shoes, a gear rotatably mounted between and meshing with said racks, means for turning said gear, and a compression spring bearing axially against the smaller end of one of said racks and against the corresponding shoe.

7. In a brake, a drum, a pair of brake shoes mounted in said drum and adapted for a parallel movement into engagement with the annular wall of the drum, racks slidably engaging said shoes and mounted for wedge action against the shoes, a gear rotatably mounted between and meshing with said racks, and means for turning said gear.

8. In a brake, a drum, a pair of brake shoes mounted in said drum and adapted for a parallel movement into engagement with the annular wall of the drum, racks slidably engaging said shoes and mounted for wedge action against the shoes, and means for sliding said racks.

9. In a brake, a drum, a pair of brake shoes mounted in said drum and adapted for a parallel movement into engagement with the annular wall of the drum, racks slidably engaging said shoes, a gear having spiral lines of teeth engaging said racks, and means for turning said gear.

10. In a brake, a drum, a pair of brake shoes mounted in said drum and adapted for a parallel movement into engagement with the annular wall of the drum, a rotary floating member mounted between said shoes and adapted to spread them, rotatable pinions meshing with said member at opposed points between said shoes, and means for turning one of said pinions for actuating said member and shoes.

ANTHONY KOLKIEWICZ.
MAURICE M. WEINSTEIN.